(12) United States Patent
Mattern et al.

(10) Patent No.: US 10,669,096 B2
(45) Date of Patent: Jun. 2, 2020

(54) STORAGE AND RETRIEVAL VEHICLE FOR A PALLET STORAGE SYSTEM

(71) Applicant: Liebherr-Verzahntechnik GmbH, Kempten (DE)

(72) Inventors: Thomas Mattern, Rieden am Forgensee (DE); Markus Zollitsch, Haldenwang (DE)

(73) Assignee: LIEBHERR-VERZAHNTECHNIK GMBH, Kempten (DE)

( * ) Notice: Subject to any disclaimer, the term of this patent is extended or adjusted under 35 U.S.C. 154(b) by 0 days.

(21) Appl. No.: 15/656,572

(22) Filed: Jul. 21, 2017

(65) Prior Publication Data

US 2018/0022548 A1 Jan. 25, 2018

(30) Foreign Application Priority Data

Jul. 21, 2016 (DE) .................. 10 2016 009 000
Jun. 14, 2017 (EP) .................... 17 176 021

(51) Int. Cl.
| | | |
|---|---|---|
| B65G 1/04 | (2006.01) | |
| B66F 9/07 | (2006.01) | |
| B65G 1/06 | (2006.01) | |
| B66F 9/06 | (2006.01) | |
| B66F 9/10 | (2006.01) | |
| B66F 9/14 | (2006.01) | |

(52) U.S. Cl.
CPC ......... *B65G 1/0492* (2013.01); *B65G 1/0407* (2013.01); *B65G 1/06* (2013.01); *B66F 9/063* (2013.01); *B66F 9/07* (2013.01); *B66F 9/10* (2013.01); *B66F 9/141* (2013.01)

(58) Field of Classification Search
CPC ...... B65G 1/0492; B65G 1/0407; B65G 1/06; B66F 9/063; B66F 9/07; B66F 9/10; B66F 9/141
See application file for complete search history.

(56) References Cited

U.S. PATENT DOCUMENTS

| | | | |
|---|---|---|---|
| 4,033,471 A | 7/1977 | Warner | |
| 5,525,106 A * | 6/1996 | Iizuka | B65G 1/0407 |
| | | | 454/187 |
| 5,630,692 A * | 5/1997 | Hanaya | B65G 1/0435 |
| | | | 414/277 |

(Continued)

FOREIGN PATENT DOCUMENTS

| | | |
|---|---|---|
| AT | 385020 B | 2/1988 |
| DE | 3417736 A1 | 11/1985 |

(Continued)

*Primary Examiner* — Kaitlin S Joerger
(74) *Attorney, Agent, or Firm* — McCoy Russell LLP

(57) ABSTRACT

The present disclosure relates to a storage and retrieval vehicle for a pallet storage system having at least one racking system and having at least one floor rail for moving the storage and retrieval vehicle, wherein the storage and retrieval vehicle comprises at least one linear guide, in particular a telescopic linear guide, outwardly coupled via at least one vertical guide to a base body of the storage and retrieval vehicle, and wherein the base body is rotatably arranged, in particular by 360°, about the vertical axis. The present disclosure further relates to a pallet storage system having a corresponding storage and retrieval vehicle and to a modular floor rail for a pallet storage system.

21 Claims, 3 Drawing Sheets

(56) References Cited

U.S. PATENT DOCUMENTS

| | | | | |
|---|---|---|---|---|
| 5,749,693 | A * | 5/1998 | Hanaya | B65G 1/0435 414/277 |
| 6,224,313 | B1 * | 5/2001 | Fukushima | B65G 1/0407 414/280 |
| 6,441,991 | B2 * | 8/2002 | Ostwald | G11B 15/68 360/92.1 |
| 6,590,841 | B2 * | 7/2003 | Ostwald | G11B 15/68 369/30.42 |
| 6,600,623 | B2 * | 7/2003 | Ostwald | G11B 15/68 360/92.1 |
| 6,754,037 | B1 * | 6/2004 | Ostwald | G11B 15/68 360/92.1 |
| 7,106,538 | B2 * | 9/2006 | Minemura | G11B 15/68 360/71 |
| 8,162,585 | B2 * | 4/2012 | Tsujimoto | B65G 1/0407 414/273 |
| 8,827,621 | B2 * | 9/2014 | Inagaki | H01L 21/67733 414/282 |
| 9,196,290 | B2 * | 11/2015 | Hashimoto | G11B 17/225 |
| 9,202,485 | B1 * | 12/2015 | Krick | G11B 5/39 |
| 9,428,336 | B2 * | 8/2016 | Hagen | G07F 11/165 |
| 9,725,953 | B2 * | 8/2017 | Morikawa | E06C 7/16 |
| 9,728,434 | B2 * | 8/2017 | Inagaki | H01L 21/67733 |
| 9,764,898 | B2 * | 9/2017 | Tanaka | B66F 9/072 |
| 9,919,869 | B2 * | 3/2018 | Tanaka | B65G 1/0407 |
| 9,944,464 | B2 * | 4/2018 | Ueda | B65G 1/0407 |
| 10,023,385 | B2 * | 7/2018 | Shibata | H01L 21/67769 |
| 2004/0191032 | A1 * | 9/2004 | Foulke | B65G 1/04 414/280 |
| 2010/0104405 | A1 * | 4/2010 | Amada | B65G 1/0407 414/281 |
| 2013/0209203 | A1 * | 8/2013 | Rafols | B65G 1/0407 414/279 |
| 2014/0079518 | A1 * | 3/2014 | Qi | B66F 9/07 414/632 |
| 2017/0121109 | A1 * | 5/2017 | Behling | B66F 9/07513 |
| 2017/0138069 | A1 * | 5/2017 | Omori | B65G 1/065 |
| 2017/0267453 | A1 * | 9/2017 | Hellenbrand | B65G 47/8823 |
| 2017/0283170 | A1 * | 10/2017 | Kawamura | B65G 1/0407 |
| 2018/0022548 | A1 * | 1/2018 | Mattern | B65G 1/0492 414/279 |
| 2018/0072498 | A1 * | 3/2018 | Abe | H01L 21/00 |
| 2018/0076079 | A1 * | 3/2018 | Abe | H01L 21/67769 |

FOREIGN PATENT DOCUMENTS

| | | | |
|---|---|---|---|
| DE | 3725795 A1 | 2/1989 | |
| DE | 10001666 A1 | 7/2001 | |
| DE | 102013019419 A1 | 5/2015 | |
| JP | 2013006632 A * | 1/2013 | |
| WO | WO-2014109001 A1 * | 7/2014 | B60K 1/00 |

* cited by examiner

STORAGE AND RETRIEVAL VEHICLE FOR A PALLET STORAGE SYSTEM

CROSS REFERENCE TO RELATED APPLICATIONS

This application claims priority to German Patent Application No. 10 2016 009 000.6, entitled, "STORAGE AND RETRIEVAL VEHICLE FOR A PALLET STORAGE SYSTEM," filed Jul. 21, 2016, and European Patent Application No. 17 176 021.8, filed Jun. 14, 2017, the entire contents of which are hereby incorporated by reference in its entirety for all purposes.

TECHNICAL FIELD

The present disclosure relates to a storage and retrieval vehicle for a pallet storage system having at least one racking system and having at least one floor rail for moving the storage and retrieval vehicle, wherein the storage and retrieval vehicle comprises at least one linear guide, in particular a telescopic linear guide, outwardly coupled via at least one vertical guide to a base body of the storage and retrieval vehicle, and wherein the base body is rotatably arranged, in particular by 360°, about the vertical axis. The present disclosure further relates to a pallet storage system having a corresponding storage and retrieval vehicle and to a modular floor rail for a pallet storage system.

BACKGROUND AND SUMMARY

The pallet store can be a pallet storage system for workpieces on pallets such as Euro-pallets, machine pallets, tool containers, grid crates or similar. The pallet store can in this respect comprise a racking system that can be expanded by modules and at least one floor rail or floor guide rail that can be expanded by modules and at least one storage and retrieval vehicle in accordance with the present disclosure that can travel on the floor rail. The pallet storage system can be protected from being accessed by a machine operator or by other persons by means of safety fencing, whereby a corresponding safety aspect can be implemented.

Storage and retrieval vehicles known from the prior art for pallet storage systems typically do not allow servicing, that is loading or unloading, stacks or machine tools by means of the storage and retrieval vehicle at all sides of the storage and retrieval vehicle and thus making possible an all-round arrangement of loading stations or machine tools.

Against this background, it is the object of the present disclosure to provide an apparatus that offers the possibility of carrying out an individual loading of the loading rack or of the racking system as well as a machine loading or a loading of machine tools or a loading of an automation solution such that an all-round loading of the corresponding components is possible, in particular from the right and from the left or at at least two sides of the storage and retrieval vehicle and in particular in direct proximity with the storage and retrieval vehicle as well as at transverse sides of floor rails of corresponding pallet storage systems. A storage and retrieval vehicle should furthermore be provided that enables a less expensive configuration of the total pallet storage system on the basis of a simple oil management.

This object is achieved in accordance with the present disclosure by a storage and retrieval vehicle having at least one racking system and having at least one floor rail for moving the storage retrieval vehicle, wherein the storage and retrieval vehicle comprises at least one linear guide, in particular a telescopic linear guide, outwardly coupled via at least one vertical guide to a base body of the storage and retrieval vehicle, and wherein the base body is rotatably arranged, in particular by 360°, about the vertical axis.

The linear guide can in this respect comprise one or more telescopic cylinders, with the term telescopic not having to be understood as restrictive. A design as a rigid chain or as another mechanism that enables a telescopic function is also conceivable. The feature of the base body relates to a component of the storage and retrieval vehicle that can have the greatest vertical extent of the storage and retrieval vehicle and can, for example, be designed in column form. A vertical guide is provided at the base body for the moving of the linear guide in a vertical direction or along the base body. Differing from the above-named 360°, the rotation range of the base body can also be more or less than 360°. In the present case, the vertical axis means an axis that is arranged perpendicular to the subsurface of the storage and retrieval vehicle, with deviations from the perpendicular likewise being conceivable.

It is conceivable in an embodiment in this respect that the storage and retrieval vehicle comprises exactly one outwardly disposed linear guide or at least two outwardly disposed linear guides and/or exactly one carriage for receiving, removing and/or holding transported products or at least two carriages for receiving, removing and/or holding transported products.

The storage and retrieval vehicle serves the handling of the products or transported products in the racking system or in machine tools or other machines or loading stations correspondingly arranged along the floor rail. At least one carriage for receiving, removing and/or holding transported products can be provided at the linear guide for this purpose. The storage and retrieval vehicle can be an automatic dynamic robot, in particular in the form of the named storage and retrieval vehicle that is in particular movable in parallel with the loading stations. The loading stations can be the aforesaid racks, machine tools or special automation solutions that are arranged on or at the floor rail.

It is conceivable that the robot or the storage and retrieval vehicle is configured as a simple storage and retrieval vehicle having at least one outwardly disposed linear guide. This brings about the advantage that a very space-saving variant can be provided that in this respect ensures an ideal loading and unloading. It is alternatively conceivable that the robot is configured as a double storage and retrieval vehicle having at least two outwardly disposed telescopic linear guides. This provides the advantage that a fast pallet change can be implemented with a small construction size change. In addition, the storage and retrieval vehicle has a large range thanks to the outwardly disposed telescopic linear guide. Sufficient space for a machine operator can thereby be kept free between, for example, a machine tool loaded by the pallet storage system and the pallet storage system itself. It is thus possible to carry out maintenance, etc. on a malfunction arising, for example, on the conversion of a machine tool during the operation of the pallet storage system without stopping the entire system. The personnel required for this purpose can use the sufficient space between the machine and the pallet storage system for a required access.

It is conceivable in an embodiment that two outwardly disposed linear guides are in particular arranged angled by 90° with respect to one another and/or that two carriages for receiving, removing and/or holding transported products are in particular angled by 90° with respect to one another. The carriages can in this respect be arranged movably at in particular each linear guide. A corresponding angled arrangement in this respect facilitates a fast pallet change in which one pallet is first removed from the racking system by the first linear guide or by the first carriage and another pallet provided on the second linear guide or on the second carriage is pushed into the space of the racking system that has become free.

Provision can be made in an optional embodiment that the storage and retrieval vehicle comprises a pallet receiver, in particular a width-adjustable pallet receiver as schematically represented as pallet receiver 28 in FIG. 2, for lifting pallets of different widths. Alternatively or additionally, the storage and retrieval vehicle (1, 11) comprises a fast-change system for coupling at least one further design of a pallet receiver. It is conceivable that the pallet receiver is configured such that the pallet receiver can be adjusted in width during the handling of workpieces on pallets, etc. so that pallets of different widths and thus rack bins of different widths can thus also be handled or serviced accordingly. This provides the advantage that a variation and an ideal adaptation to storage conditions can be implemented.

The fast-change system in this respect has a coupling receiver 27 for receiving further designs of a pallet receiver 28, in particular a fork for handling machines or Euro-pallets. It is conceivable to provide a predefined interface at the storage and retrieval vehicle by means of which an automated fork change can be performed. With the automated solution, a locking mechanism has to be provided at the changer system that is, for example, configured as a locking piston, a locking ring or as locking spheres. A fast-change system provides the advantage of achieving increased flexibility of the system with respect to the handling demands. The same base machine can be present in all the embodiments in this respect.

It is conceivable in an optional embodiment that the transported product transported or held by the linear guide at the outer region of a base body of the storage and retrieval vehicle can be held by the storage and retrieval vehicle directly at the base body or at a minimal spacing from the base body. It is advantageously possible due to the minimized spacing between the column or the base body or the storage and retrieval vehicle, on the one hand, and the transported products, on the other hand, to provide a storage and retrieval vehicle that in particular takes up little space within a pallet storage system in the loaded state.

In a further optional embodiment, provision can be made that the storage and retrieval vehicle is movable along the floor rail on a sliding carriage, represented as sliding carriage 22 in FIG. 1, and/or is movable in a horizontal plane and/or direction along the floor rail.

It is furthermore conceivable that an oil sump (also referred to herein as an oil tray), represented as oil tray 21 in FIG. 2, is arranged at the storage and retrieval vehicle, in particular pivotably and couplably beneath at least one of the carriages and/or that the oil tray is provided in a lower region of the storage and retrieval vehicle and/or that the oil tray is movable, deformable and/or insertable flexibly and/or relative to the storage and retrieval vehicle in at least on direction, in particular a horizontal direction.

It is advantageous with a corresponding oil tray that no oil protection apparatus such as oil-tight floor rails are required and simultaneously the oil supply or oil disposal of the storage and retrieval vehicle can be ensured.

The emptying of the oil sump can be implemented by means of an oil pump that is provided for this purpose and that pumps the oil out of the container or out of the oil sump.

A correspondingly deformable, movable or insertable oil sump can evade obstacles on the travel path of the storage and retrieval vehicle, whereby the storage and retrieval vehicle can be moved past obstacles closer to them. This is related to the fact that the oil sump in parts of the storage and retrieval vehicle can be its outermost contour and is therefore at particular risk from collision when obstacles or other objects are present in the proximity of the travel route of the storage and retrieval vehicle. The oil tray can be adjusted or deformed accordingly in this plane or approximately in this plane, as described above, and can hereby evade obstacles. The horizontal direction means the general direction of movement of the storage and retrieval vehicle which, however, does not have to be exactly horizontal.

In a possible embodiment of the present invention, the energy store is replaceable. The storage and retrieval vehicle can in particular be designed such that a discharged energy store can be replaced with a charged energy store. The replacement may take place without the storage and retrieval vehicle having to be mechanically released.

A charging of the energy store via an energy supply device of the storage and retrieval vehicle can be dispensed with by the replacement of the energy store in a possible embodiment.

Alternatively, the replaceability can be present in addition to the recharging capability of the energy store at the vehicle. The storage and retrieval vehicle may have a replacement station for a manual and/or automatic replacement of the energy store. The replacement station may enable access to the storage and retrieval vehicle and a manual replacement and/or has an automation device that removes the energy store from the storage and retrieval vehicle and replaces it with another energy store. The replacement station may have a charging apparatus for charging one or more energy stores.

The present disclosure is furthermore directed to a pallet storage system having at least one racking system, at least one storage and retrieval vehicle, and at least one floor rail for moving the storage and retrieval vehicle; wherein the storage and retrieval vehicle comprises at least one linear guide outwardly coupled via at least one vertical guide to a base body of the storage and retrieval vehicle; and wherein the base body is rotatably arranged about a vertical axis.

The pallet storage system or the storage system can be a fully automatic storage system that enables a modular design of the system by means of racking segments and floor rail segments and that simultaneously enables different loading possibilities such as in particular a loading at the front side of, for example, the racking elements and a direct machine loading of machines or machine tools arranged along the floor rails. A loading at the front side in this respect means a loading in the end regions of the floor rail. The outwardly disposed linear guide of the storage and retrieval vehicle can in this respect be moved at a vertically extending column or at the base body of the storage and retrieval vehicle tangentially to or along the outer contour of the column linearly to the loading and unloading of racking storage spaces or of machine tools. It is possible by the arrangement of the corresponding linear guide at the outer side of the storage and retrieval vehicle to guide pallets or transported products picked by the storage and retrieval vehicle very close to the vertical column, whereby a particularly small lateral extent of the storage and retrieval vehicle with gripped transported products results. The floor rail for moving the storage and retrieval vehicle can thereby be laid particularly close to the rack elements of the racking system and end-face regions of the floor rail or of the pallet storage system can be used for storing pallets or for processing workpieces by means of machine tools positionable there and operable by means of the storage and retrieval vehicle, whereby a particularly space-saving arrangement of the total pallet storage system is possible.

It is conceivable that the racking system is directly couplable to a subsurface by means of fastening elements. The subsurface can typically be a warehouse floor of the warehouse in which the pallet storage system is used. The subsurface itself does not have to form part of the subject of the present disclosure in this respect. The fastening elements can be configured as rails and/or consoles that can, for example, be screwed to the subsurface and on which a single element or a plurality of elements of the racking system are positionable and can, for example, be screwed thereto. It is conceivable to couple the elements of the racking system and the individual elements or modules of the floor rail to the subsurface by means of the same fastening elements. It is also conceivable that both at least one module of the racking system and at least one module of the floor rail can be coupled to the subsurface using a single fastening element.

Provision can be made in this respect that the at least one floor rail is composed of modules, in particular of the same design, that can be connected to one another and/or that the at least one racking system is composed of modules, in particular of the same design, that can be connected to one another. The floor rail of modular design or the racking system of modular design can thus be manufactured, transported, and assembled in a desired form in a particularly simple manner.

The floor rail can be arranged in parallel with the racking system or with the modules of the racking system, with machine tools and/or further modules of the racking system, for example, being arrangeable at the side of the floor rail disposed opposite the racking system and at the head ends or transverse sides of the floor rail. The floor rail enables the moving of the storage and retrieval vehicle, with it advantageously comprising individual segments or modules that are connectable to one another by means of connection elements. The size of the floor rails can hereby advantageously be matched to the restrictive truck size for transporting the elements, with the size of the floor rail assembled for the deployment simultaneously being able to be varied in dependence on the demands and on the circumstances so that a flexible length and thus size of the total system can be simply achieved. The modules of the floor rail are configured such that no additional arrangements or devices have to be provided thereat. No oil covers in particular have to be provided, whereby the floor rail can be manufactured less expensively overall. The principle of a modular design with predefined module dimensions can be used, with the individual floor rail segments or floor rail modules being able to be manufactured in predefined dimensions, for example between one meter and ten meters. The modules can comprise a rail section and a floor section, with the rail sections being coupled to the floor sections. Only the floor section of a module has to be connected to a subsurface and/or to a further module for the assembly or extension of a section of a floor rail provided in accordance with the invention. The rail sections arranged at the floor section or the corresponding rail section are then adapted and ready for moving a storage and retrieval vehicle. The modules can furthermore be configured with straight or curved rail sections, whereby corresponding straight or curved sections of the floor rail can be produced or established.

It is conceivable in a further optional embodiment that the region that can be reached by the storage and retrieval vehicle comprises both the longitudinal sides and the transverse sides of the floor rail, with parts of the racking system and/or other components to be reached by the storage and retrieval vehicle in particular being arranged at at least one transverse side of the floor rail.

An all-round arrangement of components of the pallet storage system around its floor rail is hereby possible, whereby a particularly space-saving pallet storage system can be produced. Components of the pallet storage system can be understood as parts of its racking system and/or as machine tools or loading stations or automation solutions that can be serviced by the storage and retrieval vehicle. The region reachable by the storage and retrieval vehicle is to be considered in this respect as any region to which the storage and retrieval vehicle can take pallets or from which it can collect pallets. The transverse side of the floor rail in the present case designates that region of a rail that corresponds to its end region or start region and in which in accordance with the prior art no loading stations, automation solutions or similar can be reached by the storage and retrieval vehicle.

It is furthermore conceivable in a further optional embodiment that a barrier is providable between a movement region of the storage and retrieval vehicle and further components of the pallet storage system such as in particular machine tools or other automation solutions for a reliable separation of the movement region of the storage and retrieval vehicle from the respective components of the pallet storage system and/or in that frontal access for operators is provided between the floor rail and at least one component of the pallet storage system.

The barrier can in this respect be designed not to allow access to the floor rail to persons and/or can conversely be designed to protect persons outside the floor rail from parts of the pallet storage system or from its contents. The barrier can, for example, comprise fence elements that are in particular movably stored and that can be moved as required between the floor rail and the corresponding component. In accordance with the invention, sufficient space can be provided between the floor rail and the respective component due to the sufficiently greatly extendable linear guide for the corresponding barrier and/or for the carrying out of, for example, maintenance work and/or assembly work at the component blocked by the rail. The frontal access can, for example, be used by operators for setting the corresponding machine tool or component and/or for carrying out maintenance work at the storage and retrieval vehicle.

Provision can furthermore be made in a further optional embodiment that the racking system of the pallet storage system comprises at least one driven rotationally symmetrical rack, schematically represented as rotationally symmetrical rack 26 in FIG. 4. The use of such a rack not only offers a simple extension possibility and an associated storage capacity extension, but likewise an increased flexibility of the system. It is conceivable to provide a combination of the racking system with a connection of the driven rotationally symmetrical rack since the number of the respective racks can be adapted without restriction to the given demands. In addition, a subsequent expansion of the storage volume is conceivable. The driven rotationally symmetrical rack to be used here has a transfer station to the storage and retrieval vehicle.

Further details and advantages of the present disclosure are explained with reference to the embodiments shown by way of example in the Figures.

DETAILED DESCRIPTION

Figure 1:
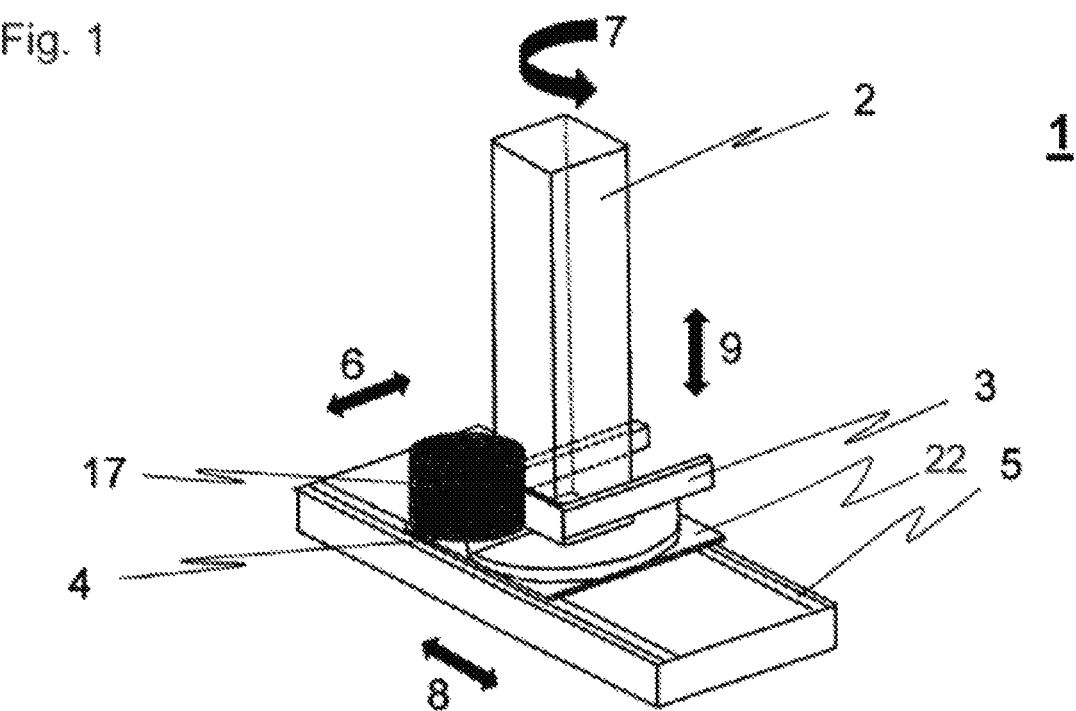
FIG. 1 shows a storage and retrieval vehicle in accordance with the invention.

FIG. 1 shows a simple storage and retrieval vehicle 1 in accordance with the present disclosure for operating a racking system 13 shown in the further Figures having corresponding rack bins 14. The storage and retrieval vehicle 1 comprises an outwardly disposed telescopic linear guide 3 that is outwardly arranged at a base body 2 or at a column 2. The base body 2 can in this respect in particular be configured as a rigidly configured column 2. The linear guide 3 is coupled to a carriage 4 by means of which transported products or stored products 17 can be handled. The storage and retrieval vehicle 1 can be traveled along a floor rail 5 in particular of modular design and provided at the floor. The workpiece 17 or the transported products 17 can be moved by means of the linear guide 3 in a linear movement 6 substantially perpendicular to the base body 2. The base body 2 can be moved on a sliding carriage along the floor rail 5 and can be rotated in a rotational movement about a vertical axis relative to the sliding carriage. The term of a sliding carriage is to be given a wide interpretation here and comprises all apparatus for moving an article along a rail or along a floor rail. The movement along the floor rail 5 can in this respect be called a travel movement in the X direction 8 and the movement of the linear guide 3 and of the carriage 4 in a vertical direction along the base body 3 can be called a vertical movement 9.

To carry out the corresponding movements of the storage and retrieval vehicle 1, a vertical travel sliding carriage can be provided that is coupled to the base body 2 in a vertically movable manner and that can be configured as a part of the linear guide 3 and/or can be coupled thereto. The vertical travel sliding carriage in this respect represents a vertical guide 29 for the linear guide. In particular parts of the linear guide 3 provided outwardly at the vertical travel sliding carriage can be traveled or moved relative to the vertical travel sliding carriage and away from the base body 2 for moving the transported products 17.

As can be recognized in FIG. 1, the transported products 17 can be brought into contact or almost into contact with the base body 2 of the simple storage and retrieval vehicle 1 by the special configuration of the linear guide 3. Due to the arrangement of the linear guide 3 at the outer regions of the base body 2, it is possible to design the storage and retrieval vehicle 1 such that no or almost no structures of the storage and retrieval vehicle 1 are present between the transported products 17 and the base body 2 and the transported products 17 can therefore be moved particularly close to the base body 2. A particularly small outer dimension of the simple storage and retrieval vehicle 1 loaded with the transported products 17 thereby results, which inter alia enables the advantage of a particularly space-saving arrangement of a pallet store equipped with a corresponding storage and retrieval vehicle 1.

Figure 2:
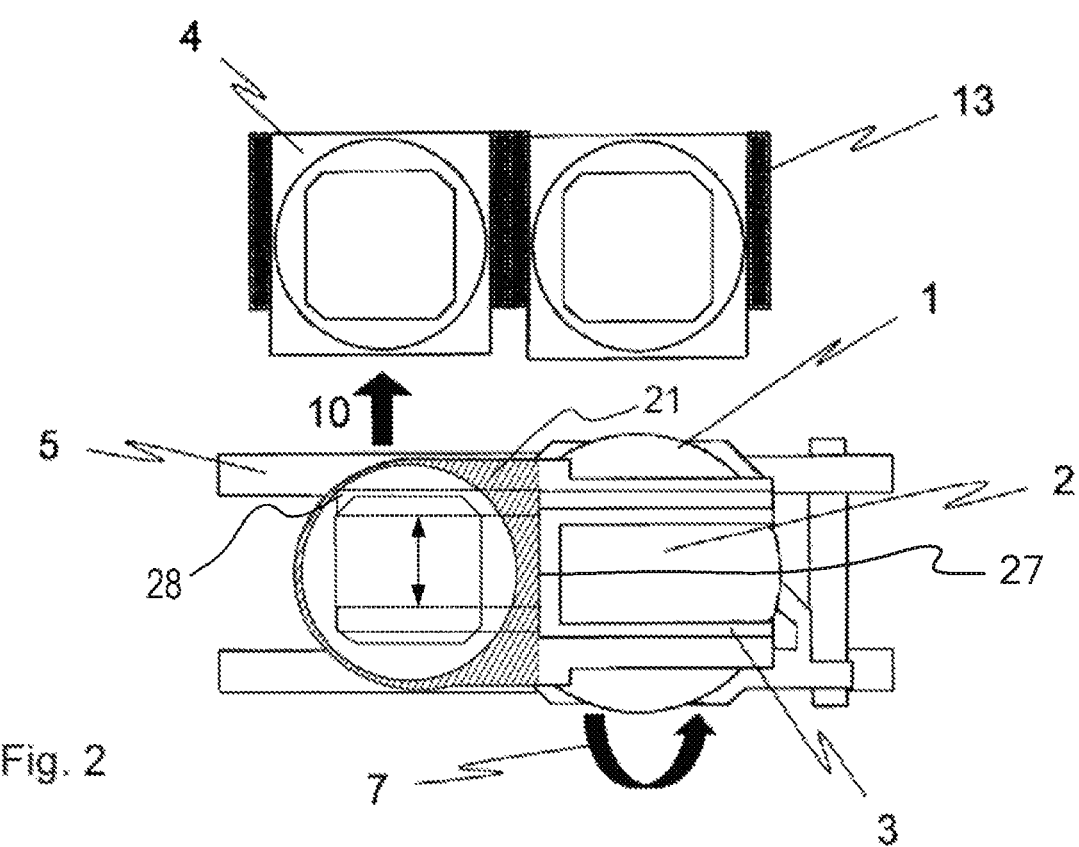
FIG. 2 shows an insertion maneuver of a storage and retrieval vehicle in accordance with the present disclosure into a racking system.

FIG. 2 shows an insertion maneuver 10 of the storage and retrieval vehicle 1 into the racking system 13. In this respect, the storage and retrieval vehicle 1 can be moved along the floor rail 5 while the base body 2 rotates about a vertical axis and the linear guide 3 moves the transported products 17 away from the base body 2. The carrying out of a vertical movement 9 of the transported products 17 can furthermore be performed in this respect. The rotational movement 7 of the base body 2 or of the linear guide 3 and the further movements of the apparatus can in this respect be carried out simultaneously or with a time offset so that the structure of the storage and retrieval vehicle 1 does not collide with the storage and retrieval system 13, with the stack bin 14 or with further adjacent structures.

Figure 3:
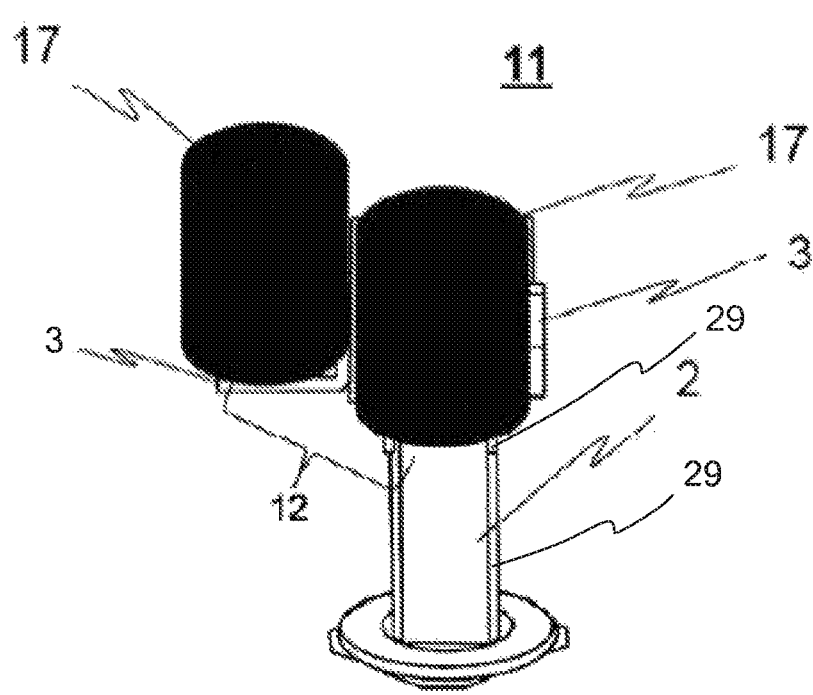
FIG. 3 shows a storage and retrieval vehicle in accordance with the present disclosure as a double storage and retrieval vehicle.

FIG. 3 shows a storage and retrieval vehicle in accordance with the present disclosure in an embodiment as a double storage and retrieval vehicle 11. In this respect, two outwardly disposed linear guides 3 can be arranged at an offset 12 of in particular 90° offset from one another at a base body 2. It is hereby possible simultaneously to manipulate two workpieces 17 or transported products 17 by means of the storage and retrieval vehicle 11. It is thus advantageously possible to empty an occupied rack space 14 or an occupied rack bin 14 by means of the double storage and retrieval vehicle 11 and to load a second transported product 17 held by the double storage and retrieval vehicle 11 in a subsequent workstep. The double storage and retrieval vehicle 11 therefore does not first laboriously have to remove an object stored in a rack bin 14 and move to a buffer storage space spaced apart from the rack bin 14 in order then to collect a workpiece 17 from a further storage space with the thus released linear guide 17 and to store it in the rack bin 14 that has become free. The storage procedure can thus be accelerated by the configuration of the storage and retrieval vehicle as a double storage and retrieval vehicle 11.

Figure 4:
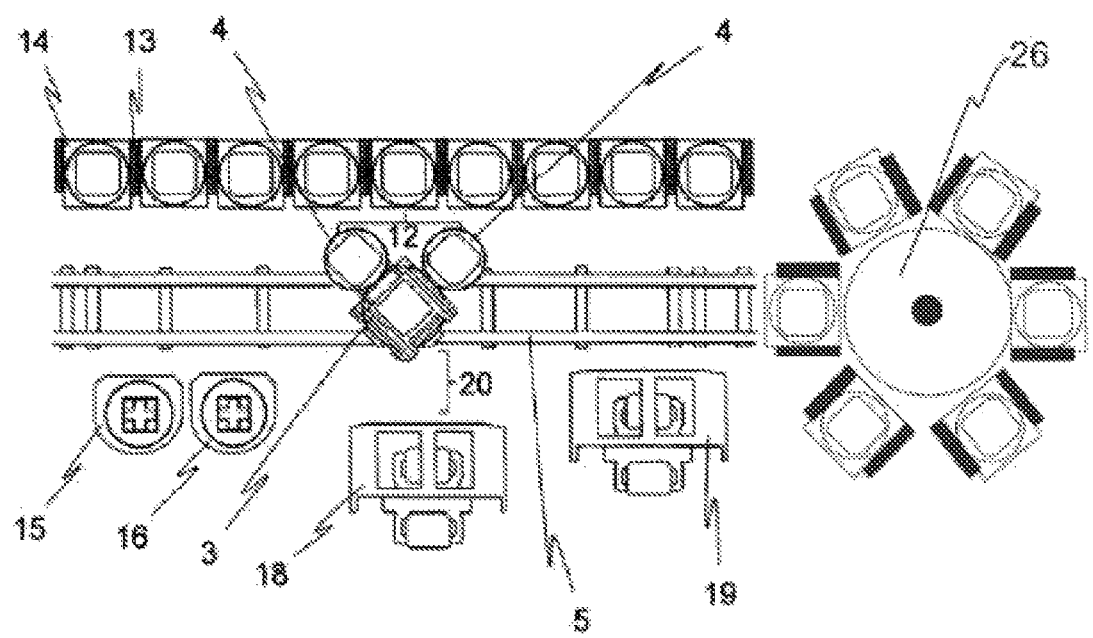
FIG. 4 shows a storage and retrieval vehicle in accordance with the present disclosure within a pallet storage system.

A possible embodiment of the pallet storage system is shown in FIG. 4 in which the storage and retrieval vehicle is configured as a double storage and retrieval vehicle 11 having two linear guides 3 arranged outwardly disposed. In this respect, a racking system 13 having corresponding rack bins 14 that can be loaded and unloaded by the double storage and retrieval vehicle 11 can be provided at a side of a floor rail 5. Further devices such as assembly stations 15, 16, machine tools 18, 19 or also further parts of the racking system 13 can be provided at the side disposed opposite the racking system 13. It is also possible to provide rack bins 14 at the end faces of the floor rail 5 due to the compact design of the storage and retrieval vehicle 1, 11. It is possible due to the correspondingly greatly extendable linear guide 3 to arrange the first machine tool 18, for example, spaced so far away from the floor rail 5 that frontal access 20 can be provided to the machine between the floor rail 5 and the first machine tool 18. This can be used, for example, by operators for setting the corresponding machine tool 18 and/or for carrying out maintenance work at the storage and retrieval vehicle 1, 11.

The subject matter of the present disclosure is thus an automatic, dynamic robot, in particular in the form of the described storage and retrieval vehicle that can be particular be moved on the floor rails within or in parallel with the loading stations such as a racking system, machine tools or special automation solutions. The storage and retrieval vehicle serves for the in-bin transfer and from-bin transfer of loads such as workpieces on pallets such as, for example, Euro-pallets, machine pallets, workpiece containers, etc. or other materials.

The storage and retrieval vehicle has a base body movable over rails arranged at the floor, outwardly disposed telescopic guides, and a carriage for receiving and removing loads.

It is conceivable that the robot is configured as a simple storage and retrieval vehicle having outwardly disposed linear guides. The telescope axis at the outside is configured such that it allows a linear movement for the reception or removal of workpieces on pallets such as Euro-pallets, machine pallets, workpiece containers, etc. It is possible to implement a space-saving design of the pallet storage system by the extension and retraction of the outwardly disposed linear guides. A rotation within the system is possible due to the relatively small construction size of the storage and retrieval vehicle, whereby a loading is possible on the right and on the left at the front side. The base body 2 is configured as a rigidly designed column 2 to which the carriage 4 is attached. The rack is able to move in the X direction on the floor rail provided at the floor.

The Figures showed that a space-saving construction is possible since no great distance is required for insertion maneuvers or turning maneuvers between the storage and retrieval vehicle and the racking system. This provides the advantage that a very space-saving variant can be provided that, however, ensures an ideal loading and unloading.

It is likewise conceivable that the robot is configured as a double storage and retrieval vehicle having outwardly disposed telescopic linear guides. The difference from the embodiment already explained above comprises the fact that two carriages are provided. The arrangement may be arranged at a 90° angle. This provides the possibility of implementing a fast pallet change, with a space-saving construction size being possible.

A simple oil management, an ideal utilization of the rack spaces and frontal access to the machine can likewise be implemented with this embodiment. The oil management can comprise an oil tray that is pivotably arranged at the storage and retrieval vehicle and that can be moved together with it.

It is conceivable that at least two linear movements and at least one rotational movement are required for an insertion movement of the carriage into the loading station. Alternatively or additionally, the carriage can carry out the insertion movement in an automation solution. An automation solution is understood in this respect as a machine tool, an assembly station or special automation solutions such as painting machines, washing stations, etc. The term automation solution is not to be understood as restrictive in this respect. On the carrying out of the insertion movement, the base body is rotated into the corresponding position with the vertical guide. The storage and retrieval vehicle 1, 11 is subsequently moved in the linear direction so that the exact position for insertion is given. The procedure of the insertion movement thus made possible has the advantage of a substantially simpler rotational movement of the storage and retrieval vehicle and thus a simpler programming or control of the storage and retrieval vehicle. A linear movement for the ideal loading or unloading of the racking system or of a automation solution is only carried out by means of the telescopic guide when the rotational movement and the linear movement have been carried out. In which orientation the storage and retrieval vehicle 1, 11 or the carriage is rotated is not important in this respect since a loading or unloading at both sides or at all sides is possible by means of the storage and retrieval vehicle 1, 11. A loading or unloading in all directions around the storage and retrieval vehicle is thus possible, in particular at the end face at the floor rail.

It is furthermore conceivable that the base body is rotatable with the vertical guide by 360° about the vertical axis and is movable horizontally on at least one floor rail 5. A rotational movement of the base body about the vertical axis is important in this context so that an ideal and exact insertion movement of the storage and retrieval vehicle 1, 11 can be implemented. This provides the possibility that no predefined orientation and loading possibility is defined since the storage and retrieval vehicle 1, 11 can be rotated and positioned in dependence on the demand. The horizontal movability of the base body is required for the mobility of the storage and retrieval vehicle 1, 11 since a movement within the total system is of essential importance. The stability of the storage and retrieval vehicle 1, 11 is ensured by means of a movement on a floor rail 5. It is advantageous in this respect that a stable and nevertheless very dynamic storage and retrieval vehicle can be provided.

It is furthermore conceivable that at least two linear guides 3 are telescopically movable in the linear direction at both sides of the base body 2 with the vertical guide. This provides the advantage that a fast pallet change can be implemented with a small construction size change. In addition, the storage and retrieval vehicle 1, 11 has a large range thanks to the outwardly disposed telescopic linear guide 3. Sufficient space for a machine operator can thereby be kept free between, for example, a machine tool loaded by the pallet storage system and the pallet storage system itself. It is thus possible to carry out maintenance etc. on a malfunction arising, for example, on the conversion of a machine tool during the operation of the pallet storage system without stopping the entire system. The personnel required for this purpose can use the sufficient space between the machine and the pallet storage system for a required access.

Provision can furthermore be made that the storage and retrieval vehicle is configured as a simple storage and retrieval vehicle or as a double storage and retrieval vehicle. The storage and retrieval vehicle 1, 11 serves the handling of the products or transported products in the racking system 13 or in machine tools or other machines correspondingly arranged along the floor rail 5. The storage and retrieval vehicle 1, 11 in a simple storage and retrieval vehicle, as also in a double storage and retrieval vehicle, has at least two outwardly disposed linear guides 3. The outwardly disposed linear guide 3 of the storage and retrieval vehicle 1, 11 can in this respect be moved at a vertically extending column 2 of the storage and retrieval vehicle tangentially to or along the outer contour of the column 2 linearly for the loading and unloading of racking storage spaces or of machine tools. This provides the advantage that it is possible by the arrangement of the linear guide 3 at the outer side of the storage and retrieval vehicle 1, 11 to lead pallets or transported products picked by the storage and retrieval vehicle 1, 11 very close to the vertical column 2, whereby a particularly small lateral extent of the storage and retrieval vehicle 1, 11 with picked transported products results. The floor rail 5 for moving the storage and retrieval vehicle 1, 11 can thereby be laid particularly close to the rack elements of the racking system 13, whereby a particularly space-saving arrangement of the total pallet storage system is possible.

The simple storage and retrieval vehicle 1, 11 in this respect only has one carriage for transporting pallets or transported products. The double storage and retrieval vehicle can likewise be oriented such that the one carriage is led very close to the vertical column 2 and the floor rail 5 only has to be removed by the spacing of the second carriage. This provides the advantage that a fast pallet change can be implemented with a small construction size change. A use of an automatic dynamic robot is likewise possible.

It is furthermore conceivable that the double storage and retrieval vehicle has two carriages for transporting pallets or transported products. This brings about the advantage that a very space-saving variant can be provided that in this respect ensures an ideal loading and unloading. These two carriages may be arranged at a 90° angle. This provides the advantage that at least two pallets or transported products can be transported by the storage and retrieval vehicle. A corresponding angled arrangement in this respect facilitates a fast pallet change in which one pallet is first removed from the racking system 13 by the first linear guide 3 and another pallet provided on the second linear guide 3 is pushed into the space of the racking system 13 that has become free. The angle of 90° is not to be understood as restrictive in this respect, however. An angle differing from the 90° is likewise possible.

Figure 5:
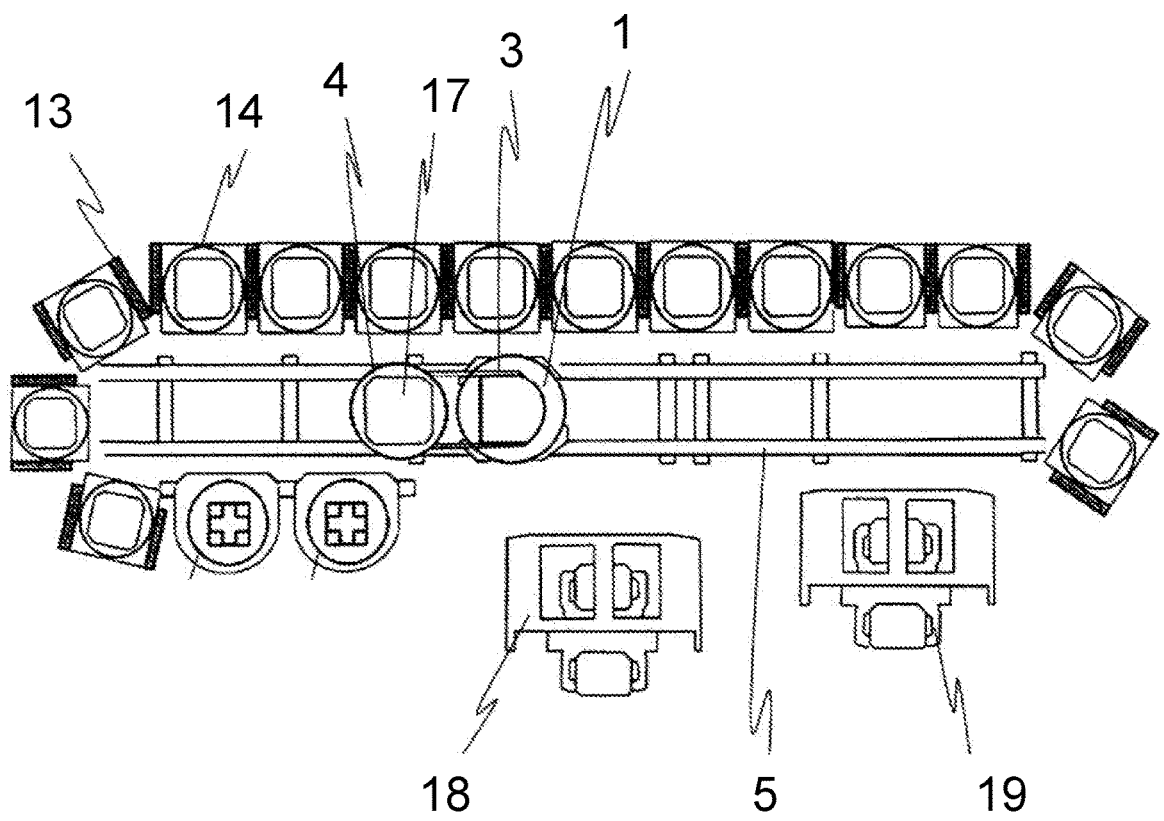
FIG. 5 shows a pallet storage system in accordance with the invention.

FIG. 5 shows a pallet storage system in accordance with the present disclosure with a storage and retrieval vehicle 1 in accordance with the present disclosure that is configured as a simple storage and retrieval vehicle 1. The storage and retrieval vehicle 1 comprises a travel sliding carriage that can be moved on the floor rail 5. A column 2 that extends upwardly in a substantially vertical direction and at which the outwardly disposed telescopic linear guide 3 is provided is arranged on the travel sliding carriage. The linear guide 3 can in this respect comprise one or more telescopic cylinders, with the term telescopic not having to be understood as restrictive. A design as a rigid chain or as another mechanism that enables a telescopic function is also conceivable.

Workpieces 17 or pallets having workpieces 17 or other transported products located thereon can be picked and raised by means of the linear guides 3 or by means of the corresponding carriage 4 and can be handled in a particularly space-saving manner in the structure of the pallet storage system. For this purpose, the carriage 4 can be coupled to the linear guide 3 that is configured for moving the transported products. The linear guide 3 can be moved together with the carriage 4 along the column 2 in the vertical direction.

It is possible by the telescopically extendable linear guide 3 or by the carriage 4 correspondingly coupled thereto also to service machine tools 18 spaced further apart from the floor guide rail 5 or to supply them with workpieces. The racking system 13 shown in FIG. 5 comprises rack bins 14 that can be arranged, as shown in the left region and right region of the floor guide rail 5, in circular form, for example, about the respective end regions of the floor guide rail 5 and are in this respect operable by the storage and retrieval vehicle 1. All the components of the pallet storage system can generally be arrangeable in the end regions of the floor rail 5 and can be operable by means of the storage and retrieval vehicle 1, 11. It is also conceivable that components such as the shown machine tool 18 can be arranged so far away from the floor rail 5 that a barrier, in particular a movable barrier, can be arranged between the floor rail 5 and the respective component, by means of which barrier the component can be separated from the floor rail 5. It is hereby possible to carry out safe maintenance work or assembly work at the component, for example, without impairing the operation of the remaining pallet storage system.

REFERENCE NUMERAL LIST 1 simple storage and retrieval vehicle
2 base body, column
3 outwardly disposed telescopic linear guides
4 carriage
5 floor rail
6 linear movement
7 rotational movement
8 X direction travel movement
9 horizontal movement
10 insertion maneuver of the storage and retrieval vehicle into the racking system
11 double storage and retrieval vehicle
12 90° offset
13 racking system
14 rack bin
15 first assembly station
16 second assembly station
17 workpiece
18 first machine tool
19 second machine tool
20 frontal access of the machine
21 oil tray
22 sliding carriage
26 rotationally symmetrical rack
28 pallet receiver

The invention claimed is:

1. A storage and retrieval vehicle for a pallet storage system having at least one racking system and having at least one floor rail for moving the storage and retrieval vehicle, wherein the storage and retrieval vehicle comprises:
   a base body,
   at least one vertical guide mounted to exterior, opposing sides of the base body, and
   at least one linear guide coupled to an exterior of the base body, relative to a vertical axis, via the at least one vertical guide,
   wherein the base body is rotatably arranged about the vertical axis.

2. The storage and retrieval vehicle in accordance with claim 1, wherein the storage and retrieval vehicle comprises exactly one outwardly disposed linear guide or at least two outwardly disposed linear guides.

3. The storage and retrieval vehicle in accordance with claim 1, wherein the storage and retrieval vehicle comprises a pallet receiver for lifting pallets of different widths; and/or the storage and retrieval vehicle comprises a change system comprising a coupling receiver configured for coupling at least one additional design of the pallet receiver.

4. The storage and retrieval vehicle in accordance with claim 1, wherein transported products transported or held by the storage and retrieval vehicle by the linear guide at an outer region of the base body are held directly at the base body or at a minimal spacing of the base body from the storage and retrieval vehicle.

5. The storage and retrieval vehicle in accordance with claim 1, wherein the storage and retrieval vehicle is movable on a sliding carriage along the floor rail and/or is movable in a horizontal plane and/or in a direction toward the floor rail.

6. The storage and retrieval vehicle in accordance with claim 1, wherein an oil sump is pivotably and couplably arranged beneath at least one carriage at the storage and retrieval vehicle.

7. The storage and retrieval vehicle in accordance with claim 6, wherein an oil tray is provided in a lower region of the storage and retrieval vehicle; and/or in that the oil tray is movable, deformable, and/or insertable flexibly and/or relative to the storage and retrieval vehicle in at least one direction.

8. The storage and retrieval vehicle in accordance with claim 1, wherein the storage and retrieval vehicle is operable via at least one energy store, and/or with the energy store being replaceable, with the storage and retrieval vehicle having a replacement station for a manual and/or automatic replacement of the energy store.

9. A pallet storage system having:
   at least one racking system,
   at least one storage and retrieval vehicle, and
   at least one floor rail for moving the storage and retrieval vehicle,
   wherein the storage and retrieval vehicle comprises a base body of the storage and retrieval vehicle and at least one linear guide outwardly coupled, relative to a vertical axis to exterior, opposing sides of the base body via at least one vertical guide, and
   wherein the base body is rotatably arranged about a vertical axis.

10. The pallet storage system in accordance with claim 9, wherein the at least one floor rail is composed of modules that are connectable to one another; and/or in that the at least one racking system is composed of modules that are connectable to one another.

11. The pallet storage system in accordance with claim 9, wherein a region reachable by the storage and retrieval vehicle comprises both longitudinal sides and transverse sides of the floor rail, with parts of the racking system and/or other components to be reached by the storage and retrieval vehicle being arranged at at least one transverse side of the floor rail.

12. The pallet storage system in accordance with claim 9, wherein a barrier is providable between a movement region of the storage and retrieval vehicle and further components of the pallet storage system; and/or in that frontal access for operators is provided between the floor rail and at least one component of the pallet storage system.

13. The pallet storage system in accordance with claim 9, wherein the racking system comprises at least one driven rotationally symmetrical rack that is a transfer station that is oriented toward the storage and retrieval vehicle.

14. The storage and retrieval vehicle in accordance with claim 1, wherein the at least one linear guide is a telescopic linear guide, and wherein the base body is rotatably arranged by 360° about the vertical axis.

15. The storage and retrieval vehicle in accordance with claim 3, wherein the pallet receiver is adjustable in width.

16. The storage and retrieval vehicle in accordance with claim 7, wherein the oil tray is movable in a horizontal direction.

17. The pallet storage system in accordance with claim 10, wherein the floor rail modules and/or the racking system modules are of a same design.

18. The pallet storage system in accordance with claim 12, wherein the further components of the pallet storage system are machine tools or other automation solutions for a reliable separation of the movement region of the storage and retrieval vehicle from the further components of the pallet storage system.

19. A storage and retrieval vehicle for a pallet storage system having at least one racking system and having at least one floor rail for moving the storage and retrieval vehicle, wherein the storage and retrieval vehicle comprises at least one linear guide outwardly coupled via at least one vertical guide to a base body of the storage and retrieval vehicle, wherein the base body is rotatably arranged about a vertical axis, wherein the storage and retrieval vehicle comprises exactly one outwardly disposed linear guide or at least two outwardly disposed linear guides, and wherein two outwardly disposed linear guides are arranged angled by 90° with respect to one another and/or in that two carriages for receiving, removing, and/or holding transported products are arranged angled by 90° with respect to one another.

20. A storage and retrieval vehicle for a pallet storage system having at least one racking system and having at least one floor rail for moving the storage and retrieval vehicle, wherein the storage and retrieval vehicle comprises at least one linear guide outwardly coupled via at least one vertical guide to a base body of the storage and retrieval vehicle, wherein the base body is rotatably arranged about a vertical axis, wherein the storage and retrieval vehicle comprises a pallet receiver for lifting pallets of different widths and/or in that the storage and retrieval vehicle comprises a fast-change system for coupling at least one further design of the pallet receiver, and wherein an oil tray is provided in a lower region of the storage and retrieval vehicle and/or in that the oil tray is movable, deformable, and/or insertable flexibly and/or relative to the storage and retrieval vehicle in at least one direction, or the pallet receiver is adjustable in width.

21. The storage and retrieval vehicle in accordance with claim 1, further comprising a coupling receiver shaped to receive a pallet receiver and a lock coupled to the coupling receiver.

* * * * *